(12) United States Patent
Paton

(10) Patent No.: US 7,562,920 B2
(45) Date of Patent: Jul. 21, 2009

(54) DEPTH ADJUSTABLE EDGER

(76) Inventor: David J. Paton, 87 Montague Place, London, Ontario (CA) N5W 2K5

( * ) Notice: Subject to any disclaimer, the term of this patent is extended or adjusted under 35 U.S.C. 154(b) by 0 days.

(21) Appl. No.: 12/008,559

(22) Filed: Jan. 11, 2008

(65) Prior Publication Data
US 2008/0169662 A1 Jul. 17, 2008

(30) Foreign Application Priority Data
Jan. 12, 2007 (CA) .................................... 2573909

(51) Int. Cl.
*A01B 1/02* (2006.01)
(52) U.S. Cl. ......................................... 294/59; 172/372
(58) Field of Classification Search .................. 294/49, 294/50, 51, 59, 60; 172/372
See application file for complete search history.

(56) References Cited
U.S. PATENT DOCUMENTS

| | | | | |
|---|---|---|---|---|
| 127,150 A | * | 5/1872 | Cook | 111/101 |
| 1,531,751 A | * | 3/1925 | Mena | 294/60 |
| 1,628,782 A | * | 5/1927 | Janosko | 294/50 |
| 1,635,308 A | * | 7/1927 | Botsford | 294/49 |
| 3,273,930 A | * | 9/1966 | Gottfried | 111/101 |
| 3,506,296 A | * | 4/1970 | Nelson | 111/101 |
| 5,310,231 A | * | 5/1994 | Burkhart | 294/59 |
| 5,671,553 A | * | 9/1997 | Burkhart | 37/270 |
| 5,826,668 A | * | 10/1998 | Kosmalski | 172/19 |
| 5,857,528 A | * | 1/1999 | Robinson | 172/372 |

* cited by examiner

*Primary Examiner*—Dean J Kramer
(74) *Attorney, Agent, or Firm*—Eric Fincham

(57) ABSTRACT

A depth limiting shovel having a blade with a vertically extending slot therein, a depth limiting member having a horizontal element and a vertical element slidable within the slot, the horizontal element extending transversely across the blade. The depth limiting member preferably is adjacent the rear face of the shovel blade.

4 Claims, 2 Drawing Sheets

DEPTH ADJUSTABLE EDGER

FIELD OF THE INVENTION

The present invention relates to an adjustable shovel.

BACKGROUND OF THE INVENTION

Many different types of shovels are known in the art. Thus, hand shovels have a different number of blade configurations ranging from the straight spade to those whose cutting edge comes to a tip. Some shovels will have raised side walls to contain the material thereon. Similarly, handles will vary ranging from a straight shaft to those having a D handle at the end.

Each shovel is designed for one or more different uses. Shovels are widely used in gardening for lifting soil and for trimming and cutting at the edges of gardens as well as for removing sod.

Often, there is a requirement that the shovel extend downwardly into the earth or other medium for a certain distance. Generally, this is left up to the user to make an approximation as to the depth of cut. Obviously, inexperienced users can have a great difficulty in estimating the depth of the cut.

SUMMARY OF THE INVENTION

It is an object of the present invention to provide a shovel which will cut only to the depth desired.

According to one aspect of the present invention, there is provided a shovel comprising a blade, a shaft connected to the blade, the blade having a vertically extending slot therein, a depth limiting member having a horizontal element and a vertical element, the horizontal element extending transversely across the blade, the vertical element being securable to the blade by means of the slot.

The shovel of the present invention may be of any desired configuration though preferably, a shovel commonly known as a spade is utilized. The blade will either be straight or have a slight curvature.

The depth limiting member will, in a preferred embodiment, have a generally L-shaped configuration to provide the horizontal element and the vertical element. The vertical element preferably conforms to the configuration of the rear of the blade. While reference herein will be made to the depth limiting member being situated at the rear or back face of the shovel, it will be understood that it could also operate on the front face.

The depth limiting member slides in a vertical slot formed in the blade of the shovel. This may be arranged by having a pin or other projection extending outwardly from the vertical element in a sliding relationship with the slot. Alternatively, the vertical member may merely have an aperture formed therein and a nut and bolt (or other suitable fastener) may be utilized.

Preferably the vertical element of the depth limiting member will have a pair of ears or flanges, one being located at each end thereof. These ears or flanges prevent the depth limiting member from rotating while being used.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
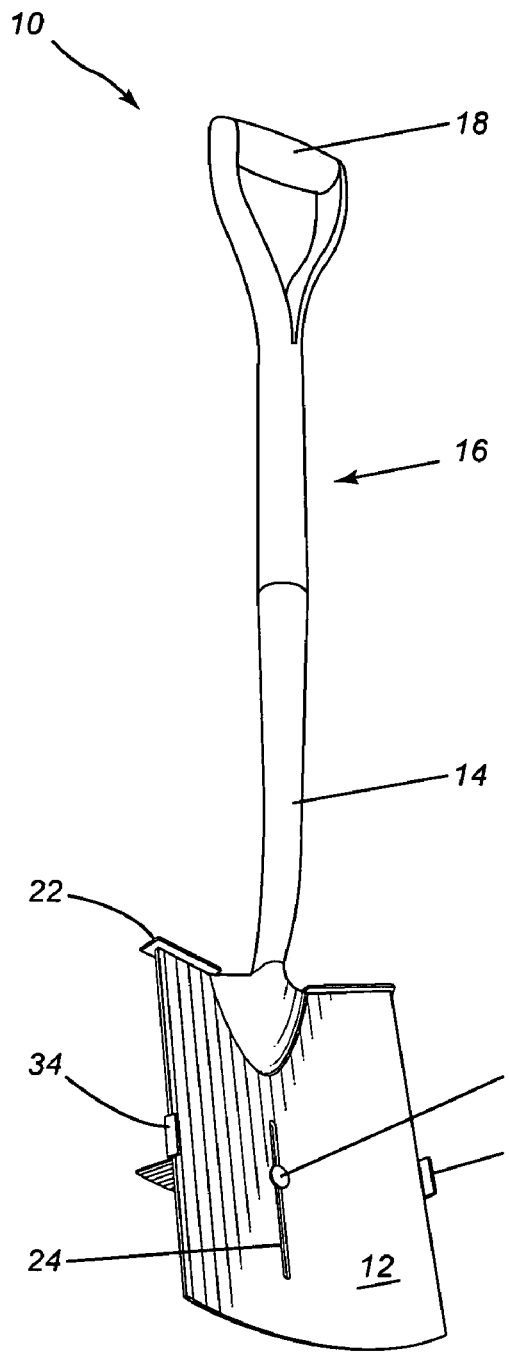
FIG. 1 is a front perspective view of a shovel according to one embodiment of the present invention.
Figure 2:
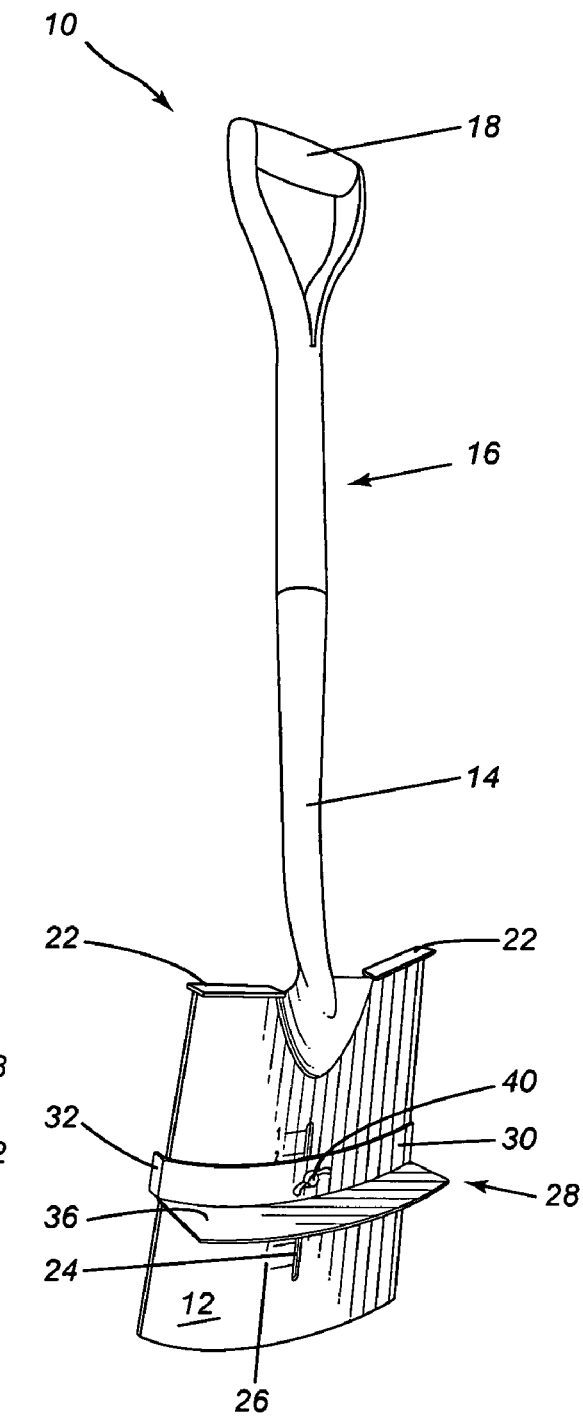
FIG. 2 is a rear perspective view thereof.
Figures 3, 4, 5, 6, 7, 8:
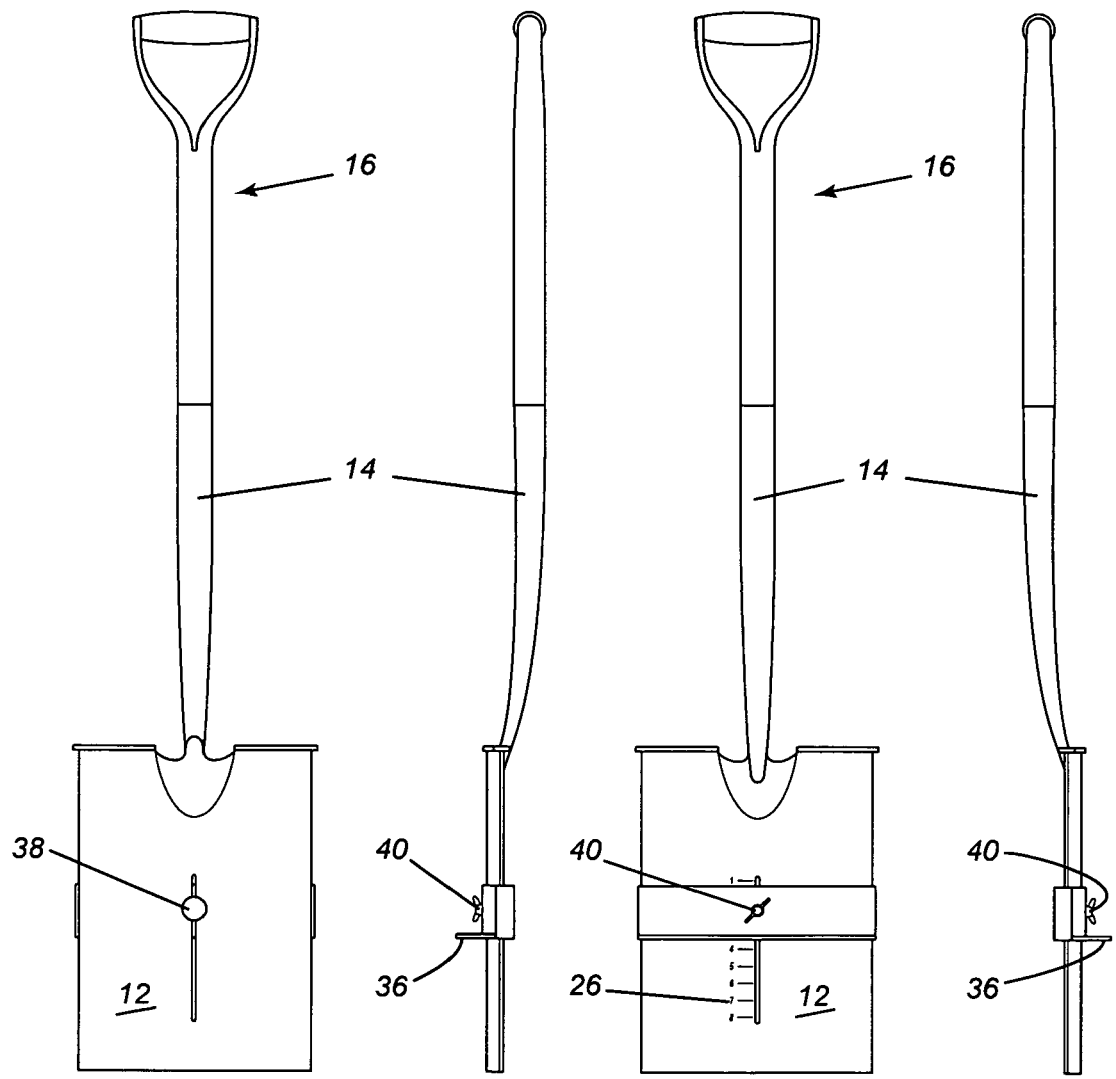
FIG. 3 is a front elevational view of the shovel.
FIG. 4 is a side elevational view thereof as seen from the left hand side of FIG. 3.
FIG. 5 is a rear elevational view thereof.
FIG. 6 is side elevational view as seen from the right hand side of FIG. 3.
FIG. 7 is a bottom plan view thereof.
FIG. 8 is top plan view thereof.

Referring to the drawings in greater detail and by reference characters thereto, there is illustrated in the drawings a shovel according to an embodiment of the present invention and which shovel is generally designated by reference numeral 10.

Shovel 10 includes a blade 12, a shaft portion 14, and a handle portion 16. Handle portion 16 includes a D handle 18 in a conventional arrangement.

Blade 12, in the illustrated embodiment, has a slight concave configuration although it will be understood that other configurations may be utilized. Blade 12 includes a top flange 22 which functions as a foot support when utilizing the shovel.

In the middle of blade 12, there is provided a slot 24 with indicia 26 aligned therealong. Indicia 26 may merely be markings or alternatively, may represent a unit of measurement from the bottom edge of the shovel.

A depth limiting member indicated generally by reference numeral 28 includes an upper securing portion 30. Upper securing portion 30 has the same general configuration as blade 12 and includes a pair of flanges 32, 34 extending forwardly of the shovel. Flanges 32, 34 serve to prevent twisting of the depth limiting member when the shovel is used.

A limiting portion 36 extends perpendicularly outwardly from upper securing portion 30 and is designed to limit the depth of insertion of the blade 12 into the earth or other medium by abutting the earth. Depth limiting member 28 is secured to the shovel by means of a bolt 38 and a wing nut 40.

It will be understood that the above described embodiment is for purposes of illustration only and that changes and modifications may be made thereto without departing from the spirit and scope of the invention.

I claim:

1. A shovel comprising:
   a blade, a shaft connected to said blade;
   said blade having a vertically extending slot therein;
   a depth limiting member having a horizontal element and a vertical element;
   said horizontal element extending transversely across said blade;
   said vertical element being securable to said blade by means of said slot;
   said horizontal element and said vertical element defining a generally L-shaped configuration, said vertical element conforming to the shape of the blade; and
   said vertical element having a flange extending forwardly at each end thereof.

2. The shovel of claim 1 wherein said vertical element is secured by means of a nut and bolt arrangement.

3. The shovel of claim 1 wherein said blade has indicia on a rear face thereof.

4. The shovel of claim 1 wherein said shovel is a spade.

* * * * *